United States Patent
Brin et al.

(10) Patent No.: US 10,305,914 B1
(45) Date of Patent: May 28, 2019

(54) SECURE TRANSFER OF SECRETS FOR COMPUTING DEVICES TO ACCESS NETWORK RESOURCES

(71) Applicant: CyberArk Software Ltd., Petach-Tikva (IL)

(72) Inventors: Max Brin, Rosh HaAyin (IL); Tal Kandel, Pardes Hana Karkur (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/150,580

(22) Filed: Oct. 3, 2018

(51) Int. Cl.
| | |
|---|---|
| H04L 29/06 | (2006.01) |
| H04L 9/32 | (2006.01) |
| H04L 9/08 | (2006.01) |
| G06F 21/60 | (2013.01) |
| G06F 21/53 | (2013.01) |
| G06F 21/78 | (2013.01) |
| G06F 21/64 | (2013.01) |

(52) U.S. Cl.
CPC .......... H04L 63/102 (2013.01); G06F 21/53 (2013.01); G06F 21/604 (2013.01); G06F 21/64 (2013.01); G06F 21/78 (2013.01); H04L 9/0894 (2013.01); H04L 9/3234 (2013.01); H04L 9/3236 (2013.01); *G06F 2221/2105* (2013.01); *G06F 2221/2141* (2013.01); *G06F 2221/2149* (2013.01)

(58) Field of Classification Search
None
See application file for complete search history.

(56) References Cited

U.S. PATENT DOCUMENTS

| | | | | |
|---|---|---|---|---|
| 2003/0046589 A1* | 3/2003 | Gregg | ............... | G06F 21/335 726/5 |
| 2003/0133575 A1* | 7/2003 | Challener | ............ | G06F 21/57 380/277 |
| 2005/0138384 A1* | 6/2005 | Brickell | ............... | G06F 21/57 713/182 |
| 2006/0015723 A1* | 1/2006 | Lui | ................... | G06F 21/125 713/167 |
| 2006/0053302 A1* | 3/2006 | Yasaki | ............... | H04L 9/0822 713/183 |
| 2006/0107032 A1* | 5/2006 | Paaske | ................ | G06F 21/57 713/2 |
| 2006/0129824 A1* | 6/2006 | Hoff | ................... | H04L 9/3234 713/176 |

(Continued)

*Primary Examiner* — William J. Goodchild
(74) *Attorney, Agent, or Firm* — Finnegan, Henderson, Farabow, Garrett & Dunner, LLP (57) ABSTRACT

Disclosed embodiments include securely transferring secrets to network resources. Aspects involve receiving, in a protected environment, a secret credential associated with an identity; storing, in the protected environment, the secret credential in an association with the identity and the network resource; receiving a request for authentication of the identity to the network resource; accessing, in response to the request and on behalf of the identity, the secret credential from storage in the protected environment; and signing an outgoing communication sent from the identity and addressed to the network resource. The network resource may be configured to validate the signed outgoing communication. The outgoing communication may be signed without storing the secret credential in the local exposed memory of the computing device.

19 Claims, 5 Drawing Sheets

(56) References Cited

U.S. PATENT DOCUMENTS

2007/0101401 A1* 5/2007 Genty ................. H04L 63/0442
                                                                    726/3
2012/0323717 A1* 12/2012 Kirsch ............... G06Q 20/0855
                                                                    705/26.1
2017/0147801 A1* 5/2017 Hamlin ................. G06F 21/32

* cited by examiner

SECURE TRANSFER OF SECRETS FOR COMPUTING DEVICES TO ACCESS NETWORK RESOURCES

BACKGROUND

When computing devices (e.g., mobile phones, tablets, laptops, etc.) need to communicate with remote, access-protected network resources, they often make themselves vulnerable to credential theft. If a computing device locally stores a password, authentication credential, or other secret, the secret may be stolen by a malicious user with access to the computing device. Further, if the computing device utilizes a password manager (e.g., LastPass™, 1Password™, aWallet™, KeePass™, etc.), the secret likewise becomes exposed to theft because it is stored, at least temporarily, in local memory (e.g., random access memory) of the computing device. Indeed, with a password manager, the secret is transferred as a plaintext string over the Internet, usually with encryption, directly to a keystore. In this process, the secret is stored for at least some time as plaintext in the local memory of the computing device.

When a secret is stored in local memory on a computing device, the secret is vulnerable to theft or other attacks. For example, if a malicious user has access to the local memory, they may steal or wrongly use the secret. In addition, in some situations the attacker may listen in to the communication channel being utilized by the computing device (e.g., after the attacker has escalated its privileges through other attacks) and steal the secret from the monitored communications.

Certain forms of trusted execution environments or trusted platform modules have been developed, in part as an effort to attempt to secure the use of secrets on computing devices. Examples of trusted execution environments or trusted platform modules include Arm TrustZone™, Apple Secure Enclave™, Android KeyStore™. Such technologies may provide hardware isolation on a computing device for execution of trusted software. While these techniques may help to secure certain data and processing on a computing device, they do not eliminate the attack surface that is created when secrets are stored in local memory on a computing device. For example, using such technologies, a user's initial authentication still occurs in the unprotected environment on the computing device. The added security of the trusted execution environments or trusted platform modules is thus powerless to stop attackers, especially where the computing device has already been compromised or infected by an attacker.

In view of these vulnerabilities and deficiencies in existing approaches, technological solutions are needed to provide for the secure transfer of secrets to network resources. For example, techniques are needed for fully shifting the initial authentication phase for a user into a protected environment, not an exposed environment, of a computing device. Techniques are also needed for maintaining secrets in the protected environment. Further, techniques are needed for enabling ongoing secure communications between an application on a computing device (which may be in an exposed environment) and an access-protected network resource.

SUMMARY

The disclosed embodiments describe methods, systems, apparatuses, and computer-readable media storing instructions for securely transferring secrets to network resources.

In some embodiments, a computer readable medium may include instructions that, when executed by at least one processor, cause the at least one processor to perform operations for securely transferring secrets to network resources. The operations may comprise receiving, in a protected environment, a secret credential associated with at least one identity, the secret credential being operable for signing communications on behalf of the at least one identity to a network resource, wherein the secret credential is not stored on a local exposed memory of a computing device used by the at least one identity; storing, in the protected environment, the secret credential in an association with the at least one identity and the network resource; receiving a request for authentication of the at least one identity to the network resource; accessing, in response to the request and on behalf of the at least one identity, the secret credential from storage in the protected environment; and signing an outgoing communication sent from the at least one identity and addressed to the network resource, wherein the network resource is configured to validate the signed outgoing communication; wherein the outgoing communication is signed without storing the secret credential in the local exposed memory of the computing device.

According to some embodiments, the computing device is a mobile device that separately comprises the local exposed memory and the protected environment.

According to further embodiments, the protected environment has a dedicated and secure memory that is separate from the local exposed memory of the computing device.

In some embodiments, the protected environment has a dedicated operating system that is separate from a user-accessible operating system of the computing device.

In further embodiments, the protected environment is implemented on the computing device as a system-on-a-chip.

According to further embodiments, the secret credential is a persistent session identifier.

In some embodiments, the operations further comprise receiving the secret credential in the protected environment in encrypted form.

In further embodiments, the operations further comprise decrypting the secret credential before signing the outgoing communication.

According to some embodiments, the computing device further executes a secret credential manager application that is configured to send the request for authentication of the at least one identity to the network resource.

According to further embodiments, the secret credential is inaccessible to the secret credential manager application.

In some embodiments, the request for authentication of the at least one identity to the network resource is received from the network resource.

Additional embodiments include computer-implemented methods for securely transferring secrets to network resources. The methods may comprise receiving, in a protected environment, a secret credential associated with at least one identity, the secret credential being operable for signing communications on behalf of the at least one identity to a network resource, wherein the secret credential is not stored on a local exposed memory of a computing device used by the at least one identity; storing, in the protected environment, the secret credential in an association with the at least one identity and the network resource; receiving a request for authentication of the at least one identity to the network resource; accessing, in response to the request and on behalf of the at least one identity, the secret credential from storage in the protected environment; and signing an outgoing communication sent from the at least one identity and addressed to the network resource, wherein the network resource is configured to validate the signed outgoing communication; wherein the outgoing communication is signed without storing the secret credential in the local exposed memory of the computing device.

In some embodiments, the method further comprises receiving, from the network resource, sensitive data and non-sensitive data; storing the received sensitive data in the protected environment; and storing the received non-sensitive data in the local exposed memory.

In some embodiments, the protected environment maintains a plurality of secret credentials stored in an association with a plurality of network resources.

In further embodiments, network addresses of the plurality of network resources are stored in the association with the plurality of secret credentials.

According to some embodiments, wherein signing the outgoing communication includes inserting a signature into a field of a data packet addressed to the network resource.

According to further embodiments, the signing is based on a hash of the secret credential.

Additional embodiments relate to a computing device configured for securely transferring secrets to network resources. The computing device may comprise an exposed environment comprising an exposed operating system, an exposed local memory, and one or more exposed applications accessible to at least one identity; and a protected environment comprising: a protected operating system, and a secret credential registry that associates a secret credential with the at least one identity and a network resource, the secret credential being operable for signing communications on behalf of the at least one identity to the network resource, wherein the secret credential is not stored in the exposed local memory, wherein the secret credential registry is configured to access, in response to a request for authentication of the at least one identity, the secret credential from storage in the protected environment for signing an outgoing communication from the exposed environment to the network resource.

According to further embodiments, the protected environment is implemented as a system-on-a-chip of the computing device.

According to additional embodiments, the protected environment and exposed environment each have separate kernels.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The various implementations described herein overcome many drawbacks of existing approaches to secrets management. For example, unlike conventional password managers that transfer secrets as clear plaintext strings over an encrypted SSL channel (e.g., LastPass™, 1Password™, aWallet, KeePass, etc.) and store the secret temporarily in local random memory, the disclosed techniques enable the transfer of secrets without ever storing a secret in plaintext in a local exposed memory. According to disclosed techniques, the user's computing device may receive and transmit secrets through a fully isolated environment, separate from the main CPU or ECU of the computing device. For example, within the computing device, a protected execution environment may be maintained separately from an exposed environment, each of which have separate operating systems, separate kernels, and separate memories.

As used herein, the terms exposed environment and local exposed memory refer to portions of a computing device that are used for the main computing operations of the device and are generally accessible to users of the device. As discussed further below in connection with FIG. 1, the exposed environment may include one or more locally running applications, which run according to a local operating system and a kernel. The exposed environment may also include a temporary memory (e.g., RAM or Flash), or more persistent data storage, and various input/output interfaces for connecting to external devices and software and for receiving user input. The exposed environment is thus inherently vulnerable to attackers who may have gained control of the computing device, have infected the computing device with malware, or are monitoring communications activity of the computing device.

The term protected environment, in contrast to the exposed environment, refers to a trusted execution environment or trusted platform module that is hosted on the computing device separate from the exposed environment. As disclosed herein, the protected environment may be fully isolated from the exposed environment, having its own dedicated operating system, kernel, and hardened memory. The protected environment may be based, at least in part, on trusted platforms such as Arm TrustZone™, Apple Secure Enclave™, Android KeyStore™. When an application available in the exposed environment requires authentication (e.g., at a remote authentication server), the application may request the protected environment to authenticate itself (or an associated identity) in its name with a predefined or runtime-defined authentication service endpoint (e.g., via HTTP). As discussed further below, the protected environment may authenticate directly, on behalf of the application (or identity) with the application service endpoint. The authentication may result in a persistent session identifier (e.g., authentication token, session token, cookie, signature hash or key, etc.), which may be stored in the protected environment and used for later session identification of the application (or identity). The protected environment may then decrypt the persistent session identifier (e.g., using a first-contact-exchanged key stored in the protected environment) and sign future communications between the application in the exposed environment and an external network resource (e.g., with a signature hash or token based on the persistent session identifier). In some implementations, the protected environment may be based on discrete hardware components (e.g., memory, processor), while in other embodiments the protected environment may be based on a system-on-chip (SoC) architecture.

An identity, in embodiments discussed below, may be any account, person, machine, IoT device, application, or entity attempting to access an access-restricted application service or target endpoint, such as a secure database, server, storage device, another identity, etc. in the network environment 100 of FIG. 1, below. In some embodiments, an identity may be an automated and/or computerized entity (e.g., virtual machine, virtualized container, serverless code, AWS™ Lambda code, etc.). For example, a computerized entity may be a scheduled backup service, task, etc. performed by one or more processors or systems. An identity may also be, for example, a local account on a computer or computer system that is established according to a particular operating system (e.g., Microsoft Windows™, MAC OS™ Unix/Linux, etc.), a particular security service, or another service or protocol governing the computer or computer system. An identity may also be a network account, such as an account established according to a network operating system (e.g., a Microsoft™ network operating system, a Cisco™ network operating system, a Dell™ network operating system, a Unix/Linux network operating system, etc.).

Figure 1:
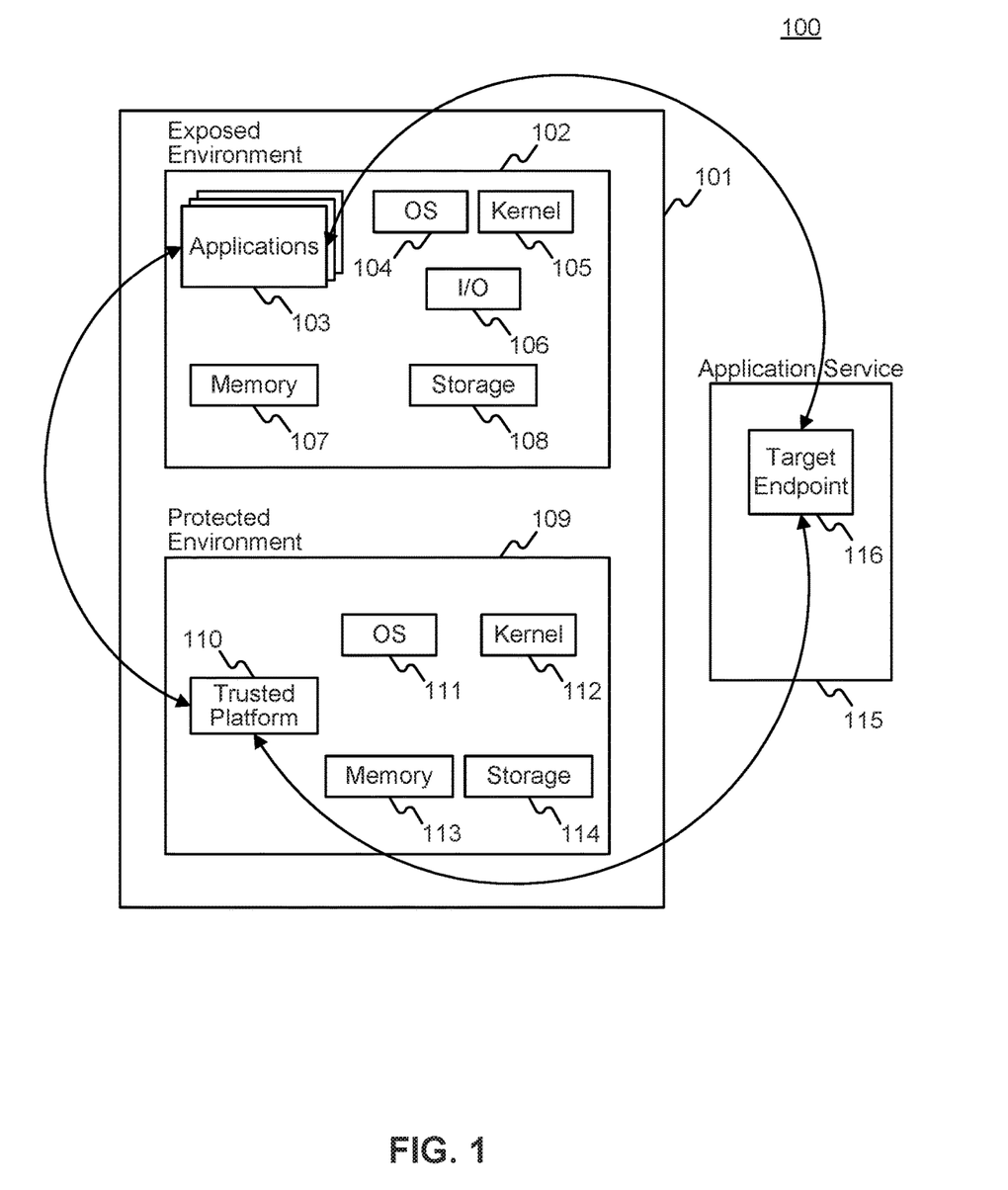
FIG. 1 is a block diagram of an example system for the secure transfer of secrets, in accordance with disclosed embodiments.

FIG. 1 is a block diagram of an example system 100 for the secure transfer of secrets consistent with disclosed embodiments. As shown, system 100 includes a computing device 101, which may communicate through a network with a target endpoint 116 within an application service 115.

The computing device 101 may be a variety of types of computer-based devices, such as laptops, desktop computers, smartphones, tablets, personal digital assistants, enterprise digital assistants, smart cards, smart watches, smart bands, smart headphones, computer-embedded clothing, car-computers and other in-vehicle computer equipment, smart home appliances, or any other computing device with computer processing and network connectivity capabilities. As illustrated, the computing device 101 may comprise an exposed environment 102 and a protected environment 109.

The exposed environment 102, as discussed above, may generally be accessible to users of the computing device 101 (e.g., to directly execute local applications 103, store data in memory 107, or store persistent data in storage 108. Exposed environment 102 may have a hardware processor that runs an operating system 104 (e.g., an Apple™ or Microsoft™ operating system, or a mobile-specific operating system such as Apple iOS™, Android™, Microsoft Windows Mobile™, etc.), together with an associated kernel 105. Temporary memory 107 may be RAM or Flash memory used for temporary storage of data in connection with execution of local applications 103 or other user processes. Storage 108 may include more persistent storage (e.g., a local database, directory, firmware, etc.). Input/output interface 106 may include a wired or wireless network connectivity interface (e.g., cellular, WiFi, Bluetooth™, radio frequency, USB™ Ethernet, wireless mesh network, or any other standardized or proprietary network communications technology). Further, input/output interface 106 may include a user-accessible input device (e.g., touchscreen, keypad, keyboard, stylus, microphone, camera, sensor, etc.) and output device (e.g., display screen, speaker, etc.).

Protected environment 109, as described above, is an isolated and secure environment on computing device 101. As illustrated, protected environment 109 includes its own operating system 111 and kernel 112, as well as its own memory 113 and persistent storage 114, both of which may be encrypted. Further, protected environment 109 may include a trusted platform 110, which may be configured to carry out or participate in the software operations described below for the secure transfer of secrets. In some embodiments, one or more components of protected environment 109 may be deployed using circuitry or an SoC such as Arm TrustZone™, Apple Secure Enclave™, or Android KeyStore™.

The computing device 101 may communicate with a target endpoint 116 at application service 115 through a network, which may be based on any type of computer networking arrangement used to exchange data. Examples include the Internet, a wired Wide Area Network (WAN), a wired Local Area Network (LAN), a wireless WAN (e.g., WiMAX), a wireless LAN (e.g., IEEE 802.11, Bluetooth, etc.), a mobile network, a private data network, a virtual private network using a public network, and/or other suitable connection (e.g., NFC, infrared, etc.) that enables the system 100 to send and receive information between the components in the system 100.

Application service 115 may be any network destination or resource provider to which computing device 101 seeks access. For example, application service 115 could be a company's private network (e.g., on-premises LAN or cloud-based system), a third-party web service requiring authentication (e.g., Netflix™ Google Play™, eBay™ Apple App Store™ Amazon™ etc.), a government or utility web service (e.g., water company, electricity provider, public school, local government, etc.), or various other types of network resources that require authentication for access. Target endpoint 116 may be a particular network resource within application service 115 that provides a requested service. As an illustration, application service 115 may be a collection of servers associated with Netflix™ and target endpoint 116 may be a particular service or server that hosts a user's individual account page and/or serves streaming video to the client device 101. Similarly, application service 115 may be a company's private network and target endpoint 116 may be a particular database being accessed by the client device 101. In some embodiments, application service 115 and/or target endpoint 116 may be deployed in a cloud-based environment. Examples of suitable cloud-computing environments include, but are not limited to, Microsoft Azure™, Amazon Web Services (AWS)™, Google Cloud Platform™, IBM Cloud™, and similar systems. In other embodiments, application service 115 and/or target endpoint 116 may be provided through an on-premises environment or a combination of cloud and on-premises environments.

Figure 2:
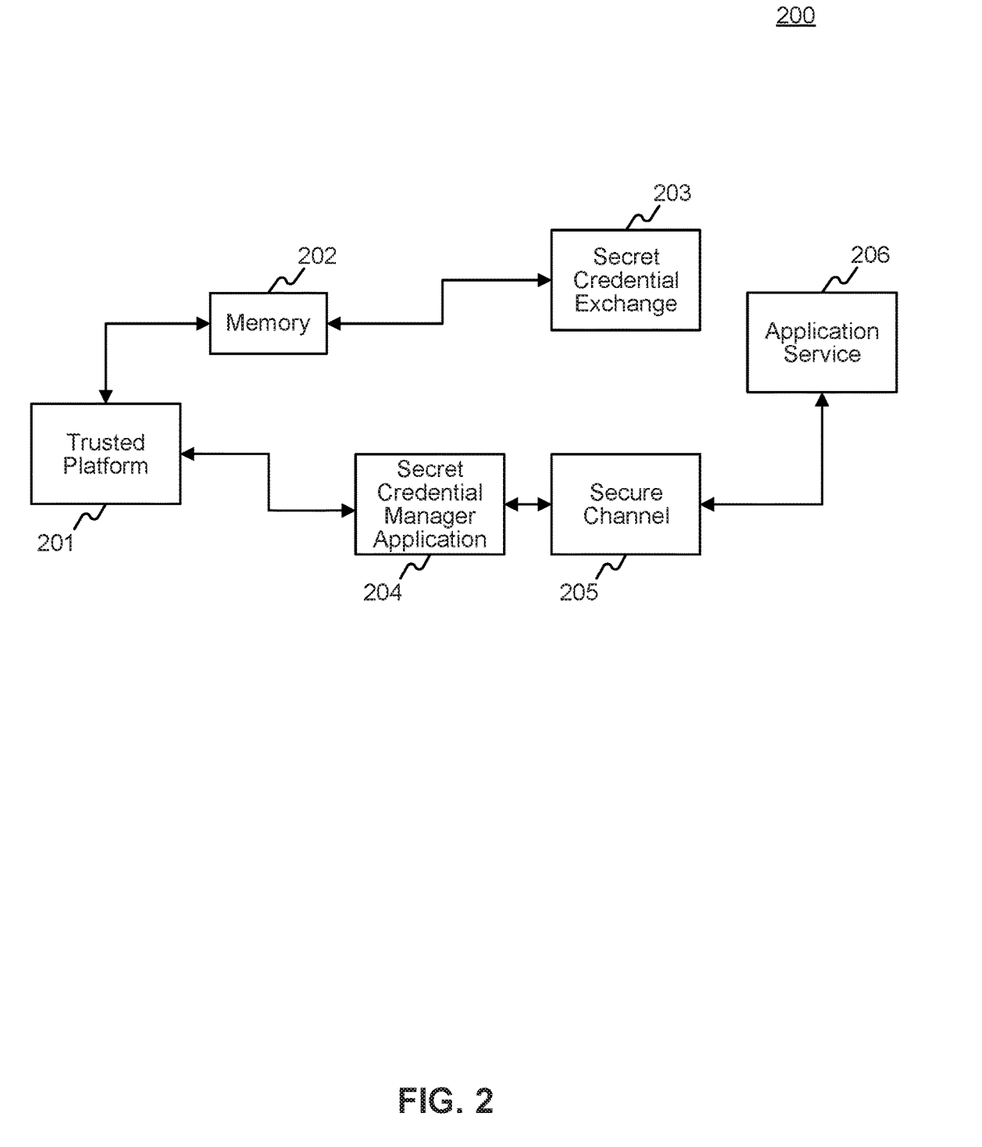
FIG. 2 is an illustration of example communications flows for the secure transfer of secrets, in accordance with disclosed embodiments.

FIG. 2 is an illustration of example communications flows 200 for the secure transfer of secrets. The operations depicted in FIG. 2 may be performed within the system framework discussed above in connection with FIG. 1. For example, trusted platform 201 may correspond to trusted platform 109, memory 202 may correspond to memory 113 and/or storage 114, and application service 206 may correspond to application service 115. The communications flows 200 of FIG. 2 are further discussed below in connection with FIGS. 4 and 5.

In accordance with FIG. 2, trusted platform 201 may receive an indication that an application running in the exposed environment of a client device (e.g., email application, secure database application, social networking application, etc.) requires authentication in order for the client device to access a remote application service 206 associated with the application. This may occur in several ways. For example, the application may directly request (e.g., through an API associated with the application) that trusted platform 201 perform an authentication process on behalf of the application or an associated identity. Further, the trusted platform 201 may monitor outgoing communications (e.g., HTTP/HTTPs communications) from the application and, when trusted platform 201 detects that an application will require authentication in order to communicate with a particular requested target application service, intercept the communication and perform authentication for the client device or identity. In additional embodiments, the application may directly request access to the target application service, and be redirected (e.g., via an HTTP/HTTPs redirect) back to the trusted platform 201 for authentication.

In some embodiments, as discussed further below in connection with FIG. 3, the trusted platform 201 may store (e.g., in memory 202) associations between particular target application services and network addresses (e.g., IP addresses, MAC addresses, network resource identifiers, etc.) for the target application services. For example, the computing device may store applications associated with business programs, social media programs, and other types of programs, each of which may involve execution of corresponding applications, in whole or part, at a remote application service (e.g., application service 206). The trusted platform 201 may maintain a registry of network addresses for the particular application service 206 corresponding to each application available on the computing device. Further, the registry may also associate particular applications with particular identities. The registry, as discussed below, may also contain connection configuration information, credentials information, etc.

Once the trusted platform 201 has determined that an application or identity on the computing device requires authentication to access a remote application service 206, the trusted platform 201 may request a corresponding credential from secret credential exchange 203. In some embodiments, the secret credential exchange 203 may be a server associated with the trusted platform 201 itself (e.g., both being components of one cybersecurity system or service). Further, in some embodiments the secret credential exchange 203 may be associated with the application service 206. For example, if the application service 206 is a Twitter™ social networking service, secret credential exchange 203 may be a particular authentication server maintained by Twitter™ for providing connection secrets to trusted platform 201. In some embodiments, secret credential exchange 203 may be a secure credential vault, such as a vault offered by CyberArk™. Accordingly, the secret credential exchange 203 may be configured to maintain secrets (e.g., passwords, connection credentials, tokens, certificates, keys, etc.) brokered through such a vault that are never directly provided to the computing device, but instead are provided on behalf of the computing device to the application service 206.

According to additional embodiments, the secret credential exchange 203 may be part of a blockchain authentication network. For example, the blockchain authentication network may maintain several different distributed ledgers, where each ledger maintains a set of transaction records (e.g., transactions based on log-on or authentication activity of computing devices, identities, or both). The success or failure of transactions (e.g., successful authentication by an identity, failed authentication by the identity, etc.), as stored in the ledger, may be used by secret credential exchange 203 to compute a consensus level or trust level for the computing device or identity. Secret credential exchange 203 may deploy a consensus algorithm that determines whether the transactions in the shared ledger, for a particular computing device or ledger, are sufficient to authenticate or validate the computing device or identity. Based on whether the consensus or trust level exceeds a threshold, secret credential exchange 203 may determine whether to grant, or deny, a secret credential to trusted platform 201 in response to its request. This determination, in turn, may then be fed back into the shared ledger for use in future authentication decisions of the computing device or identity.

In these various embodiments, secret credential exchange 203 may be implemented in an on-premises network, or as a virtualized service in a cloud-based environment. Further, secret credential exchange 203 may be distributed among several different systems or networks, both logically and geographically.

The request from trusted platform 201 to secret credential exchange 203 for a connection secret may, in some embodiments, include information identifying the computing device (e.g., device ID, MAC address, etc.), the identity operating on the computing device (e.g., identity ID, user name, account credential, etc.), or both. For example, this information may be retrieved from the trusted platform 201 or its memory 202, and included in the request to secret credential exchange 203 for the connection secret. In such embodiments, secret credential exchange 203 may then access its own repository identifying computing devices, identities, and applications to determine whether a corresponding secret is available. For example, secret credential exchange 203 may identify, in its repository, that User A of computing device has a particular stored password or secret token that is needed to access a particular secure database maintained as part of application service 206. If the secret credential exchange 203 has a secret corresponding to the request from trusted platform 201, it may return the secret directly to trusted platform 201. Notably, because trusted platform 201 may both directly request, and receive, the secret from secret credential exchange 203, the secret need not ever pass through the exposed environment of the computing device. For example, the secret may never be stored, even temporarily, in memory or storage of the computing device's exposed environment. Instead, the secret may only be stored, if at all, in the protected environment (e.g., trusted platform 201 or its memory 202). Accordingly, even if an attacker had gained access to, or infected, the computing device and its exposed environment, the secret would remain inaccessible to the attacker.

The secret that is fetched by trusted platform 201 from secret credential exchange 203 may take various different forms. For example, for some applications, the secret may be a password, cipher key, token, certificate, or hash value, among other possibilities. In some cases, the secret may be a persistent session identifier corresponding to a session for the target application. Each application on the computing device, and each corresponding application service 206, may require different forms of secret credentials. In some embodiments, the secret is encrypted by the secret credential exchange 203 and decrypted once it is received at the trusted platform 201. For example, the trusted platform 201 and secret credential exchange 203 may both use a symmetric key encryption algorithm known to each other (e.g., based on trusted platform 201 and secret credential exchange 203 each having the same secret key), or may both participate in an asymmetric key encryption algorithm (e.g., RSA or another) where one has a private key and the other has a corresponding public key.

Once the secret is obtained at trusted platform 201, it may be decrypted, as discussed above, and used to sign future communications between the application running in the exposed environment and the target application service 206. For example, IP packets or other communications between the application and the target application service 206 may be signed using a signature hash or computed token that is based on the decrypted secret. The signature may be included, for example, in a header, trailer, or in the payload itself of the communications packets. In situations where communications from the application to target application service 206 pass through trusted platform 201, trusted platform 201 may intercept and sign outgoing communications that it receives that are addressed for application service 206. Alternatively, the application may make a request to trusted platform 201 to sign its communications before they are sent to target application service 206. Either way, notably, the secret itself need not be provided to the application or to any other element to the exposed environment. Of course, in some embodiments, the trusted platform 201 may sign outgoing data packets using techniques other than hashes of the stored secret. For example, trusted platform 201 and the application service 206 may have a prearranged signing protocol, whereby packets signed by trusted platform 201 are known by application service 206 to be legitimate and valid based on their unique signature type or format.

In some embodiments, a secret credential manager application 204 may intermediate between trusted platform 201 and application service 206. In other embodiments, there is no secret credential manager application 204, and applications running in the exposed environment may communicate directly (e.g., with their communications signed by trusted platform 201) with application service 206. Where secret credential manager application 204 is used, it may intermediate access to application service 206. For example, the data packets from the application that are signed by trusted platform 201 may be received at secret credential manager application 204, and validated based on the signature. Based on secret credential manager application 204 receiving and validating valid data packets, secret credential manager application 204 may then access a separate credential (e.g., password, token, key, certificate, etc.) needed to access application service 206. For example, secret credential manager application 204 may access the separate credential from a vault (e.g., CyberArk Vault™). In embodiments where a secret credential manager application 204 is used, it may be based in whole or part on technologies such as LastPass™, 1Password™, aWallet, or KeePass, etc. Of course, as noted above, in other embodiments secret credential manager application 204 is not used at all.

Regardless of whether communications between an application in the exposed environment and the application service 206 utilize an intermediary secret credential manager application 204, the communications may pass through a secure communications channel 205 before reaching application service 206. The secure communications channel may be established by the application itself or trusted platform 201, for example, and may be based on SSL, TLS, or a secure tunneling protocol, among other options for secure and encrypted communications.

Figure 3:
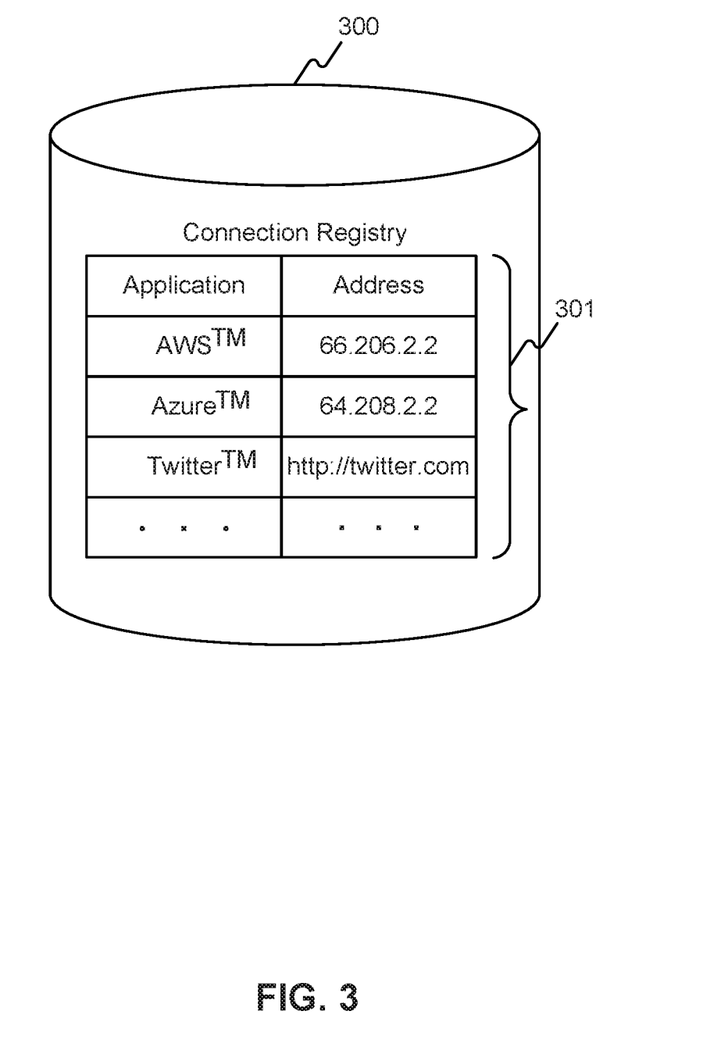
FIG. 3 is an illustration of an exemplary connection registry, in accordance with disclosed embodiments.

FIG. 3 is an illustration of an exemplary connection registry 300. Consistent with above embodiments, connection registry 300 may be maintained in protected environment 109 of FIG. 1 (e.g., in memory 113 or storage 114). In some embodiments, a similar registry may be maintained by secret credential exchange 203, as discussed above in connection with FIG. 2, which may be used to locate and fetch secrets in response to requests from trusted platform 201.

Connection registry 300 may include a data structure 301 that associates applications or identities with network addresses. For example, as shown, data structure 301 may identify a first application as being hosted in an AWS™ cloud environment and having an IP address of 66.206.2.2, a second application as being hosted in an Azure™ cloud environment and having an IP address of 64.208.2.2, and a third application as being hosted by Twitter™ and having a domain name of http://twitter.com. Of course, additional applications may be identified as well. Similarly, in some embodiments data structure 301 further links particular identities to applications (e.g., by identity ID, user name, account name, etc.). As an example, the cloud-based application stored in the AWS™ environment with an IP address of 66.206.2.2 may have three associated identities that are referenced in the data structure. Accordingly, as discussed above, when trusted platform 201 sends a request to secret credential exchange 203 for a secret, secret credential exchange 203 may be able to identify the appropriate secret that corresponds to the application stored in the AWS™ environment, the IP address 66.206.2.2, and/or one of the three identities. In situations where each of the three identities has its own corresponding secret stored at secret credential exchange 203, this information from data structure 301 may be sufficient to identify the correct secret to be fetched.

In some embodiments, repository 300 may also include other information used to fetch secrets from secret credential exchange 203 and/or establish connections with application service 206. For example, repository 300 (e.g., in data structure 301) may specify connection configuration information indicating what type of secure communications channel 205 to establish between the application in the exposed environment and the application service 206 (e.g., SSL, TLS, encrypted tunnel, etc.). Further, repository 300 may include credential information specifying how trusted platform 201 should sign communications sent from the application in the exposed environment to the application service 206 (e.g., what data to use for computing a hash, where in a data packet to insert the signature, etc.). In addition, repository 300 may include connection information specifying whether a particular application should connect through a secret credential manager application 204 or, instead, connect directly to the application service 206.

The address information stored in data structure 301 may be obtained in several ways. For example, trusted platform 201 may learn the address information from a configuration file associated with a particular application in the exposed environment, may manually receive the address information from a user, or may receive the address information based on the initial development or download of the applications to the exposed environment. The data structure 301 may be organized in various manners, ranging from simple data tables or look-up tables, to more complex database structures (e.g., XML-based, SQL-based, No-SQL-based, etc.).

Figure 4:
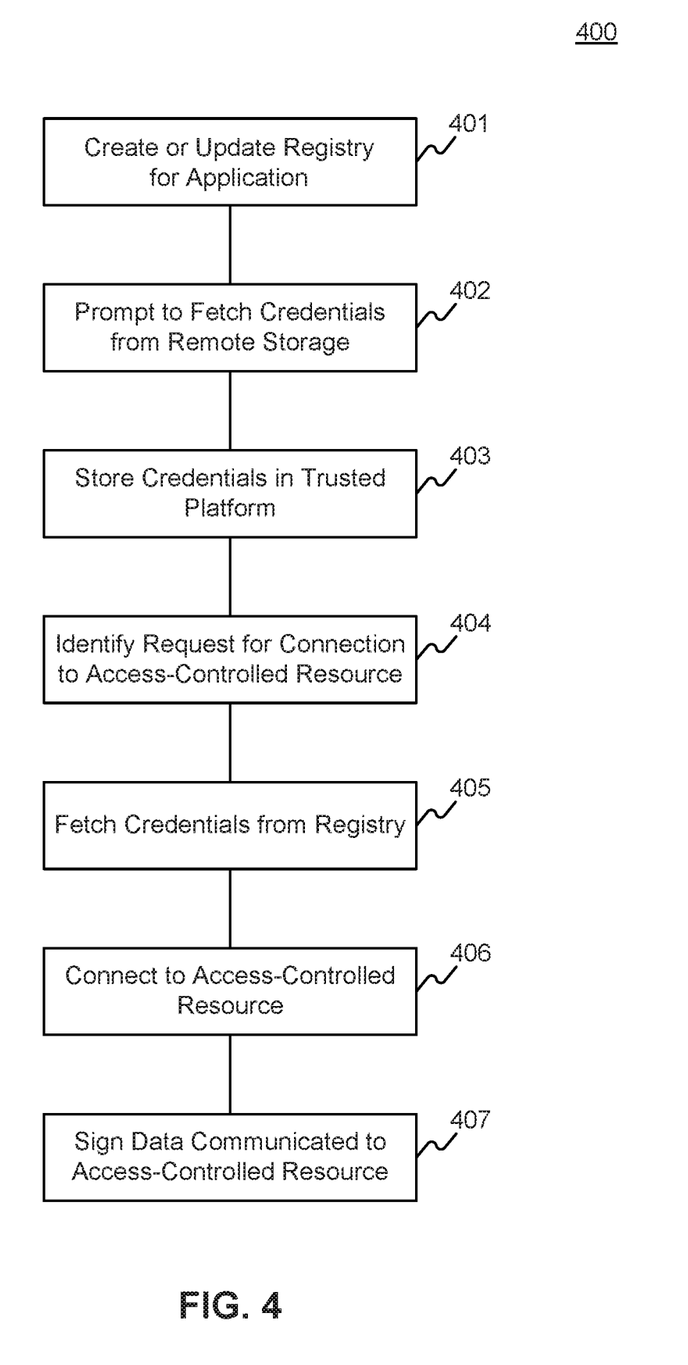
FIG. 4 is a flowchart for an example process for securely transferring secrets, consistent with disclosed embodiments.

FIG. 4 is a flowchart for an example process 400 for securely transferring secrets, in accordance with disclosed embodiments. Process 400 may be performed in the system environment described above in connection with FIG. 1, or the process flows described in FIG. 2. For example, process 400 may be performed by a component of protected environment 109 (e.g., trusted platform 110).

In an operation 401, process 400 may include an initialization phase of creating a registry for applications stored in an exposed memory of a computing device. The registry may be maintained in the protected environment 109 of the computing device 101, as discussed above. Consistent with registry 300 of FIG. 3, the registry may include various types of information regarding applications and identities, including names of the applications or identities, address information pertaining to remote network resources that are associated with the applications, connection information, and various other types of information. As discussed above, this information may be used in identifying and fetching specific connection secrets for use by trusted platform 110 of protected environment 109.

In various embodiments, operation 401 may be performed on an on-demand basis, for example in response to requests from applications 103 to access application services 115. In such embodiments, the registry may be built through a learning process of identifying application names, connection address information, and other configuration settings. Alternatively, operation 401 may be performed through an initial setup phase. For example, the registry can be created when protected environment 109 and/or trusted platform 110 are first installed or created on the computing device 101. Further, in some embodiments, the registry can be updated or further populated each time a new application is installed in the exposed environment 102 that requires authentication to access an application service 115. Accordingly, the registry can be developed all at once or gradually over time.

Process 400 may further include an operation 402 of prompting or requesting, by protected environment 109 and/or trusted platform 110, for receiving a secret credential from remote storage. For example, as discussed above in connection with FIG. 2, trusted platform 201 may request a secret for a particular application or identity from secret credential exchange 203. The request may include information from the registry discussed in connection with FIG. 3, such as the name of the application or identity, the IP address of the requested application service 206, connection settings, and other parameters. Similarly, secret credential exchange 203 itself may maintain a registry of its own, which it uses to identify and fetch a secrete corresponding to the request from trusted platform 201. The secret may be identified, as discussed above, based on the information specified in the request.

In some cases, secret credential exchange 203 may have no credential to provide to trusted platform 201. This may occur, for example, if the computing device or identity is not permitted to access the requested application service 206. This may also occur if the computing device or identity has such permissions, but a secret has not yet been generated in secret credential exchange for the computing device or identity. In that situation, a lack of a credential may trigger a prompt for secret credential exchange 203 itself to generate a secret, or to request that another resource generate a secret. Further, in some embodiments, secret credential exchange 203 may determine that a secret should not be provided to the trusted platform 201. For example, in the blockchain embodiments discussed above, this may occur if transaction information in a shared ledger indicates that the requesting computing device or identity lacks a threshold level of consensus or trust (e.g., based on prior failed log-on or authentication transactions, or other trust-reducing actions in a network). In that case, whether or not a secret corresponding to the computing device or identity is stored in secret credential exchange 203, a secret will not be provided to trusted platform.

Process 400 may also include an operation 403 of storing secrets or other credentials received from secret credential exchange 203 at the trusted platform 201. For example, as discussed above in connection with FIG. 2, secret credential exchange 203 may encrypt (e.g., symmetrically or asymmetrically) secrets before sending them to trusted platform 201. Trusted platform 201 may then decrypt the received secrets. The decryption may occur as the secrets are received (e.g., with operation 403) or as the signing process (e.g., operation 407) occurs. The secrets themselves may be stored at trusted platform 201 in either encrypted or decrypted form. If stored in encrypted form, they may be decrypted before being used to sign data communications from an application in the exposed environment, as discussed above. In some embodiments, the secrets may be stored in the repository maintained by trusted platform 201 identifying applications and/or identities.

In an operation 404, trusted platform 201 may identify a request by an application running in the exposed environment of a computing device to access an access-controlled application service 206. As discussed above, this may be performed in several different ways. For example, trusted platform 201 may be configured to monitor and intercept communications from the application that are addressed to an application service 206 requiring authentication. Alternatively, the application may be programmed to send its outgoing communications through trusted platform 201 by default. As a further option, the application may attempt to directly communicate with the target application service 206, but may be redirected (e.g., by HTTP/HTTPS redirect) to trusted platform 201.

Process 400 may further include an operation 405 of fetching a secret or other credential (e.g., from the registry maintained by trusted platform 201). As discussed above, after trusted platform 201 obtains a secret for an application or identity from secret credential exchange 203, trusted platform 201 may retrieve the stored secret when needed to sign outgoing communications from the application to the application service 206. In situations where the secret is stored in encrypted form in trusted platform 201, it may be decrypted, as discussed above, before being used to sign outgoing communications.

In an operation 406, trusted platform 201 may determine that an application in the exposed environment of the computing device is seeking access to an access-controlled application service 206. As discussed above, this may occur in several different ways. For example, the application may directly request that trusted platform 201 receive and sign data packets to be sent from the application to application service 206. Alternatively, the application may be configured by default to send data packets addressed to application service 206 through trusted platform 201. Regardless of how trusted platform 201 receives the data packets from the application, it may, in an operation 407, sign the data packets that are addressed to the application service 206. For example, in accordance with above embodiments, the trusted platform may sign the data packets (e.g., in a header, trailer, or payload field) with a signature computed as a hash of the secret received from secret credential exchange 203 for the particular application or identity. Of course, other techniques for computing the signature are possible as well. Once the signed data packets are received at application service 206, application service 206 may validate the data packets based on the signature and communicate securely with the application. Alternatively, in embodiments where a secret credential manager application 204 is utilized, the signed data packets may be received by the secret credential manager application 204 and validated based on their signature. Then, secret credential manager application 204 may send the data packets (e.g., with a new signature or new secret) to application service 206 on behalf of the application.

Figure 5:
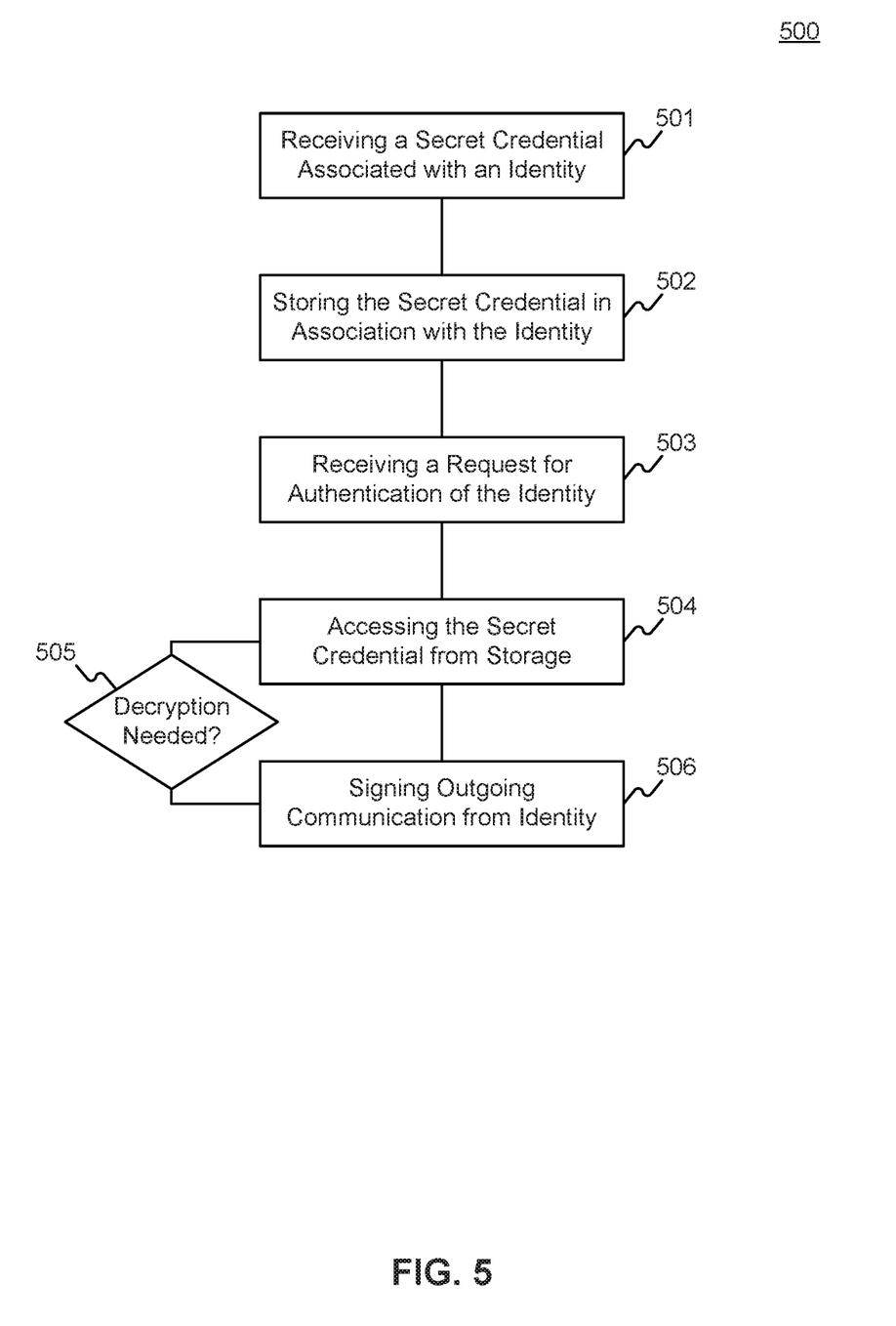
FIG. 5 is a flowchart for another example process for securely transferring secrets, consistent with disclosed embodiments.

FIG. 5 is a flowchart for another example process 500 for securely transferring secrets, in accordance with disclosed embodiments. In accordance with above embodiments, process 500 may be performed in the environment of system 100 (e.g., by protected environment 109 via trusted platform 110) and based on the process flows described in connection with FIG. 2.

In an operation 501, process 500 may include receiving, in a protected environment, a secret credential associated with at least one identity. For example, as discussed above in connection with FIG. 1, a secret may be received by protected environment (e.g., based on a request from trusted platform 110). The secret credential may be stored in the protected environment 109 (e.g., in memory 113 or storage 114). Consistent with above embodiments, the secret may be provided to protected environment 109 in a manner that corresponds to a particular application 103 or other identity associated with exposed environment 102. For example, protected environment 109 may refer to a repository (e.g., as discussed in connection with FIG. 3) to request the secret credential associated with the particular application 103 or other identity. Similarly, the provider of the secret credential (e.g., a remote secret server, a vault, etc., as discussed in connection with FIG. 2) may refer to its own repository in determining what secret to provide to the protected environment 109. The secret credential may be operable for signing communications on behalf of the identity to a network resource. For example, as discussed above, the secret credential may be used to sign data packets (e.g., IP packets) sent from the application 103 and addressed for the application service 115. In some embodiments, as discussed above, the protected environment 109 decrypts the secret credential that it receives before signing data packets on behalf of the application 103.

Notably, the secret credential is not stored on a local exposed memory (e.g., memory 107 or storage 108) of the computing device 101 used by the at least one identity. Accordingly, even if an attacker obtains access to the exposed environment 102, the attacker will not thereby gain access to the secret credential. Instead, the secret credential will be initially stored in the protected environment 109 and remain in protected environment 109. As discussed above, the secret credential may be stored in a secure (e.g., encrypted) memory of protected environment 109 (e.g., memory 113 or storage 114).

Process 500 may also include an operation 502 of storing, in the protected environment, the secret credential in an association with the at least one identity and the network resource. For example, as discussed above in connection with FIG. 1, the secret credential may be stored in memory 113 or storage 114 of protected environment 109. Again, the secret credential may be stored directly in the protected environment 109, without being stored in exposed environment 102. Consistent with the above discussion of FIG. 3, the secret credential may be stored in an association with the identity and the network resource that the identity may attempt to access with the secret credential. The repository of FIG. 3 may thus associate the computing device or identity (e.g., based on device ID, MAC address, user name, account name, etc.) with the secret credential and with the network resource (e.g., by IP address, network resource name, etc.). This information may be stored in the repository for future use by the computing device. Further, in situations where the secret credential is updated (e.g., is a one-time-use credential, or is provided on a per-session basis), the repository may be updated each time a new secret credential is received in the protected environment 109.

In an operation 503, process 500 may include receiving a request for authentication of the at least one identity to the network resource. As discussed above, this may occur in several ways. For example, the request may be a request from the application running in the exposed environment 102 to communicate with the application service 115. The request may be directly sent to protected environment 109, may be intercepted by protected environment 109, or may be received at protected environment as a redirect from the application service 115. The request may identify the identity (e.g., in terms of user ID, user name, account name, etc.). As discussed above, this information may be used to query a repository (e.g., in protected environment 109) for a corresponding secret credential.

Process 500 may also include an operation 504 of accessing, in response to the request and on behalf of the at least one identity, the secret credential from storage in the protected environment. For example, in situations where the secret credential is stored in memory 113 or storage 114 of protected environment 109, it may be accessed based on an identifier of the identity (e.g., user name, user ID, account name, etc.) or the application (e.g., application name, IP address, etc.) that the identity is seeking to access. Where the secret credential is not already stored in protected environment 109, it may be requested from protected environment (e.g., from secret credential exchange 203, as discussed in connection with FIG. 2).

Process 500 may further include an operation 505 of determining whether decryption of the secret credential is needed. As discussed above, the secret credential may be provided from secret credential exchange 203 in encrypted form. In such situations, the secret credential may be stored in the protected environment in encrypted or decrypted form. The secret credential may be decrypted by trusted platform 201 either upon receipt from the secret credential exchange 203, or as part of the process of signing outgoing communications to application service 206. Accordingly, the decryption may occur as part of operations 504 and 506 (as illustrated), or as part of operation 502.

Once the secret credential needed for an identity has been accessed, it may be used in operation 506 to sign outgoing communications sent from the identity and addressed to the network resource. For example, as discussed above, the signature may be placed in a header or trailer field of an outgoing IP packet, or in the payload itself. When the signed IP packet is received at the network resource, it may be validated by the network resource based on the unique signature format or type. In some situations, only one signed data packet needs to be validated for the identity to access the target application at the network resource. For example, validating an initial communication may be sufficient to begin a session. In other embodiments, each outgoing data packet is signed on behalf of the identity for transmission to the network resource. Each data packet received at the network resource may then be validated on the basis of its signature.

Notably, as discussed above, the process of signing data communications on behalf of the identity does not result in the secret credential being stored in the exposed environment 102 of the computing device 101. Instead, the secret credential is stored only in the protected environment 109. Accordingly, regardless of whether protected environment 109 forwards the signed outgoing communications to the exposed environment for sending to the application service 115, or protected environment 109 itself directly sends the signed outgoing communications to the application service 115, the secret credential remains securely and secretly stored in the protected environment 109. Further, once a session between the identity and the target network resource has been established, sensitive data from the session may also be stored in protected environment 109 without being stored in exposed environment 102. For example, the application service 115 may mark certain data (e.g., with metadata, with a header field, etc.) as being sensitive or confidential. When such data is received at the computing device, it may be directly stored in the protected environment 109. Further, for some sensitive or confidential applications (e.g., a business application), all data may be deemed sensitive by default and accordingly stored in the protected environment 109. For other applications (e.g., a weather application, music application, etc.), data may be deemed non-sensitive and non-confidential by default, and may be stored in exposed environment 102.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely transferring secrets to network resources, the operations comprising:
   receiving, in a protected environment of a computing device, a secret credential associated with at least one identity, the secret credential being operable for signing communications on behalf of the at least one identity to a network resource, wherein:
      the protected environment is separate from a local exposed memory of the computing device,
      the local exposed memory is accessible to the at least one identity, and
      the secret credential is not stored on the local exposed memory;
   storing, in the protected environment, the secret credential in an association with the at least one identity and the network resource;
   receiving a request for authentication of the at least one identity to the network resource;
   accessing, in response to the request and on behalf of the at least one identity, the secret credential from storage in the protected environment; and
   signing, using the secret credential, an outgoing communication sent from an application running in the local exposed memory and addressed to the network resource, wherein the network resource is configured to validate the signed outgoing communication;
   wherein the outgoing communication is signed without storing the secret credential in the local exposed memory of the computing device.

2. The non-transitory computer readable medium of claim 1, wherein the computing device is a mobile device that separately comprises the local exposed memory and the protected environment.

3. The non-transitory computer readable medium of claim 1, wherein the protected environment has a dedicated operating system that is separate from a user-accessible operating system of the computing device.

4. The non-transitory computer readable medium of claim 1, wherein the protected environment is implemented on the computing device as a system-on-a-chip.

5. The non-transitory computer readable medium of claim 1, wherein the secret credential is a persistent session identifier.

6. The non-transitory computer readable medium of claim 1, wherein the operations further comprise receiving the secret credential in the protected environment in encrypted form.

7. The non-transitory computer readable medium of claim 6, wherein the operations further comprise decrypting the secret credential before signing the outgoing communication.

8. The non-transitory computer readable medium of claim 1, wherein the computing device further executes a secret credential manager application that is configured to send the request for authentication of the at least one identity to the network resource.

9. The non-transitory computer readable medium of claim 8, wherein the secret credential is inaccessible to the secret credential manager application.

10. The non-transitory computer readable medium of claim 1, wherein the request for authentication of the at least one identity to the network resource is received from the network resource.

11. A computer-implemented method for securely transferring secrets to network resources, the method comprising:
   receiving, in a protected environment of a computing device, a secret credential associated with at least one identity, the secret credential being operable for signing communications on behalf of the at least one identity to a network resource, wherein:
      the protected environment is separate from a local exposed memory of the computing device,
      the local exposed memory is accessible to the at least one identity, and
      the secret credential is not stored on the local exposed memory;
   storing, in the protected environment, the secret credential in an association with the at least one identity and the network resource;
   receiving a request for authentication of the at least one identity to the network resource;
   accessing, in response to the request and on behalf of the at least one identity, the secret credential from storage in the protected environment; and
   signing, using the secret credential, an outgoing communication sent from an application running in the local exposed memory and addressed to the network resource, wherein the network resource is configured to validate the signed outgoing communication;
   wherein the outgoing communication is signed without storing the secret credential in the local exposed memory of the computing device.

12. The computer-implemented method of claim 11, further comprising:
   receiving, from the network resource, sensitive data and non-sensitive data;
   storing the received sensitive data in the protected environment; and
   storing the received non-sensitive data in the local exposed memory.

13. The computer-implemented method of claim 11, wherein the protected environment maintains a plurality of secret credentials stored in an association with a plurality of network resources.

14. The computer-implemented method of claim 13, wherein network addresses of the plurality of network resources are stored in the association with the plurality of secret credentials.

15. The computer-implemented method of claim 11, wherein signing the outgoing communication includes inserting a signature into a field of a data packet addressed to the network resource.

16. The computer-implemented method of claim 15, wherein the signing is based on a hash of the secret credential.

17. A computing device configured for securely transferring secrets to network resources, the computing device comprising:
   an exposed environment comprising:
      an exposed operating system,
      an exposed local memory accessible to at least one identity, and
      one or more exposed applications accessible to the at least one identity; and
   a protected environment comprising:
      a protected operating system, and
      a secret credential registry that associates a secret credential with the at least one identity and a network resource, the secret credential being operable for signing communications on behalf of the at least one identity to the network resource, wherein the secret credential is not stored in the exposed local memory,
      wherein the secret credential registry is configured to access, in response to a request for authentication of the at least one identity, the secret credential from storage in the protected environment for signing an outgoing communication from the one or more exposed applications to the network resource, and
      wherein the protected environment is separate from the exposed local memory of the computing device.

18. The computing device of claim 17, wherein the protected environment is implemented as a system-on-a-chip of the computing device.

19. The computing device of claim 17, wherein the protected environment and exposed environment each have separate kernels.

* * * * *